United States Patent [19]

Rowe

[11] Patent Number: 4,520,273
[45] Date of Patent: May 28, 1985

[54] FLUID RESPONSIVE ROTOR GENERATOR

[75] Inventor: Raymond A. Rowe, Encinitas, Calif.

[73] Assignee: The United States of America as represented by the Secretary of the Navy, Washington, D.C.

[21] Appl. No.: 533,334

[22] Filed: Sep. 19, 1983

[51] Int. Cl.³ .............................................. F03B 13/10
[52] U.S. Cl. ......................................... 290/54; 290/52
[58] Field of Search .................................. 290/42–44, 290/52–55; 310/87

[56] References Cited

U.S. PATENT DOCUMENTS

| | | | |
|---|---|---|---|
| 2,373,207 | 4/1945 | Touhey | 290/44 |
| 2,432,436 | 12/1947 | Morrill | 310/156 |
| 2,436,683 | 2/1948 | Wood | 290/52 |
| 3,157,793 | 11/1964 | Adkins | 290/52 |
| 3,187,191 | 6/1965 | Baggs | 290/52 |
| 3,876,925 | 4/1975 | Stoeckert | 322/1 |
| 4,039,849 | 8/1977 | Mater | 290/55 |
| 4,069,673 | 1/1978 | Lapeyre | 290/52 |
| 4,162,410 | 7/1979 | Amick | 290/55 |
| 4,318,019 | 3/1982 | Teasley | 310/156 |

FOREIGN PATENT DOCUMENTS 57-01399  4/1982  Japan .................................... 290/55

Primary Examiner—Stanley J. Witkowski
Assistant Examiner—Shelley Wade
Attorney, Agent, or Firm—R. F. Beers; E. F. Johnston

[57] ABSTRACT

The rotor generator includes an elongated generally cylindrically shaped framework. An elongated rotor is longitudinally aligned within the framework and is rotatably mounted therein. The rotor has a plurality of curved blades which are capable of causing rotation of the rotor when there is fluid flow, such as water or air current. The rotor has a magnetic characteristic which may be provided by attaching magnets to the rotor blades or magnetizing the blades themselves. A plurality of wires are mounted on the framework about the rotor so that when the rotor is rotated electrical current is induced in the wires. Apparatus is provided for collecting the induced electrical current so that the electrical current can be provided for power purposes, such as charging a battery. With this arrangement the rotor generator can be placed on the bottom of the ocean where there is current flow, and utilized for charging a battery which may in turn power oceanographic equipment.

16 Claims, 6 Drawing Figures

FLUID RESPONSIVE ROTOR GENERATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The U.S. Navy expends a considerable amount of effort in collecting and recording ocean water characteristics, such as temperature and salinity. Many of the oceanographic instruments utilized for collecting and recording such data are placed deep within the ocean for long periods of time. The usual arrangement for powering these instruments are batteries. When the batteries are expended the usefulness of the oceanographic instruments terminates until the batteries can be replaced. In some instances it is not practical to replace the batteries at great ocean depths. There is presently no satisfactory arrangement for in-situ recharging of batteries which are used to power oceanographic instrumentation.

STATEMENT OF THE INVENTION

The present invention is a rotor generator which can be placed on the bottom of the ocean at great depths for generating electricity in response to ocean current flow. The electricity can be utilized for recharging batteries which in turn may power oceanographic instrumentation. This has been accomplished by providing an elongated generally cylindrically shaped framework. An elongated rotor is longitudinally aligned within the framework and is rotatably mounted therein. The rotor has a plurality of curved blades which are capable of causing rotation of the rotor when there is fluid flow, such as that experienced from deep ocean currents. The rotor has a magnetized characteristic which may be magnetization of the rotor blades themselves or, alternatively, placement of a magnet on each rotor blade. A plurality of wires are mounted on the framework about the rotor so that when the rotor is rotated electrical current is induced in the wires. Apparatus is provided for collecting the induced current so that the current can be provided for power purposes, such as recharging a battery. The invention is especially useful in the deep ocean environment since it can produce electricity in response to ocean currents for extended periods of time. However, it should be understood that the invention could be utilized anywhere where there is fluid flow, such as at the top of a mountain.

OBJECTS OF THE INVENTION

An object of the present invention is to provide an improved generator for providing electricity in response to fluid flow, such as water or air currents.

Another object is to provide an ocean bottom generator for providing electricity in response to slow moving ocean currents.

A further object is to provide an electrical generator which can be placed on the bottom of the ocean at great depths for generating electricity for extended periods of time in response to ocean currents.

Still another object is to provide a long life fluid response generator which is low in cost and is easy to manufacture.

Other objects, advantages and novel features of the invention will become apparent from the following detailed description of the invention when considered in conjunction with the accompanying drawings.

DESCRIPTION OF THE PREFERRED EMBODIMENT

Figure 2:
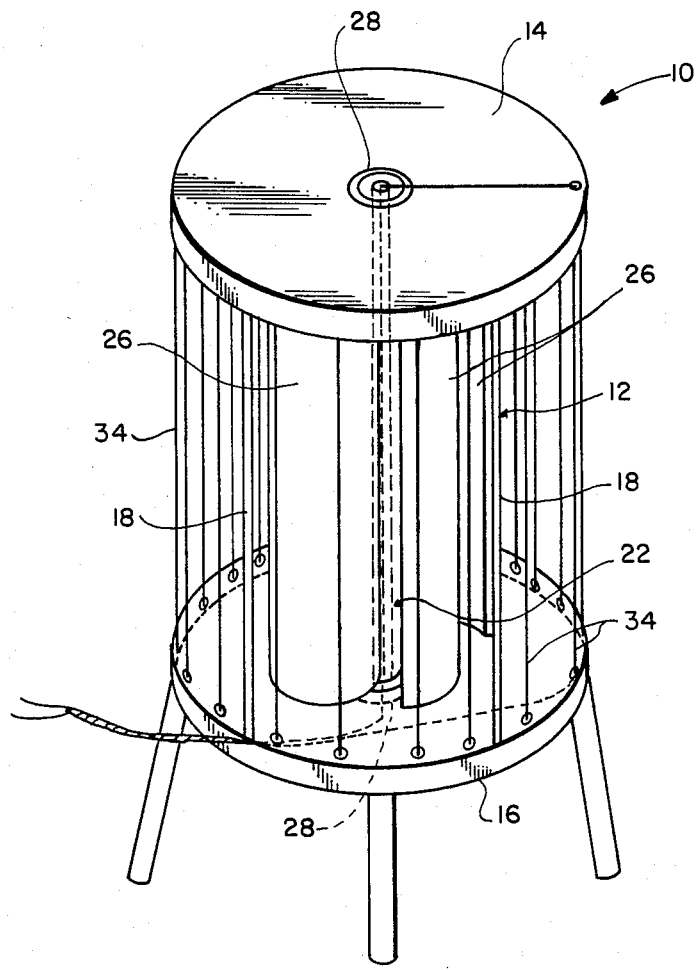
FIG. 2 is an isometric view of the rotor generator.

Referring now to the drawings wherein like reference numerals designate like or similar parts throughout the several views there is illustrated in FIG. 2 a rotor generator 10 which includes an elongated generally cylindrical shaped framework 12. The framework 12 may include a pair of spaced top and bottom hollow plates 14 and 16 which are held in place by longitudinally extending bars 18. The plates 14 and 16 are metal and the bars 18 are preferably constructed of an insulative material, such as a plastic.

Figure 1:
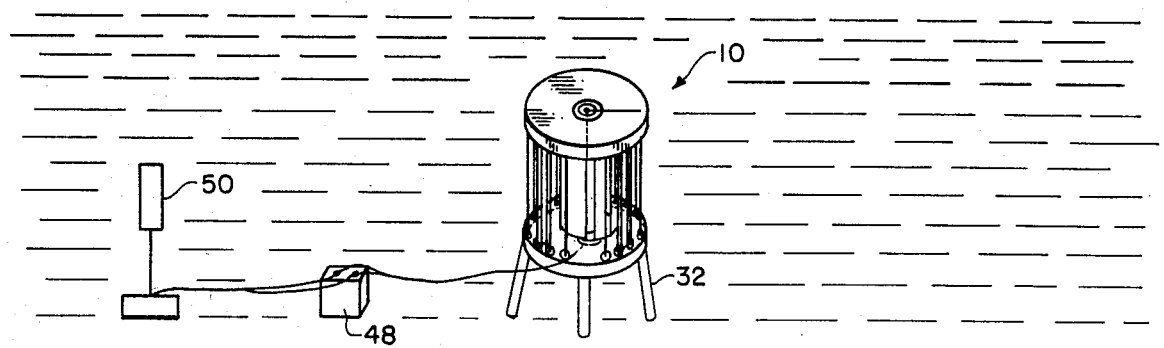
FIG. 1 is an ocean elevation view of the rotor generator resting on the bottom of the ocean for charging a battery, the battery in turn powering oceanographic equipment.
Figure 3:
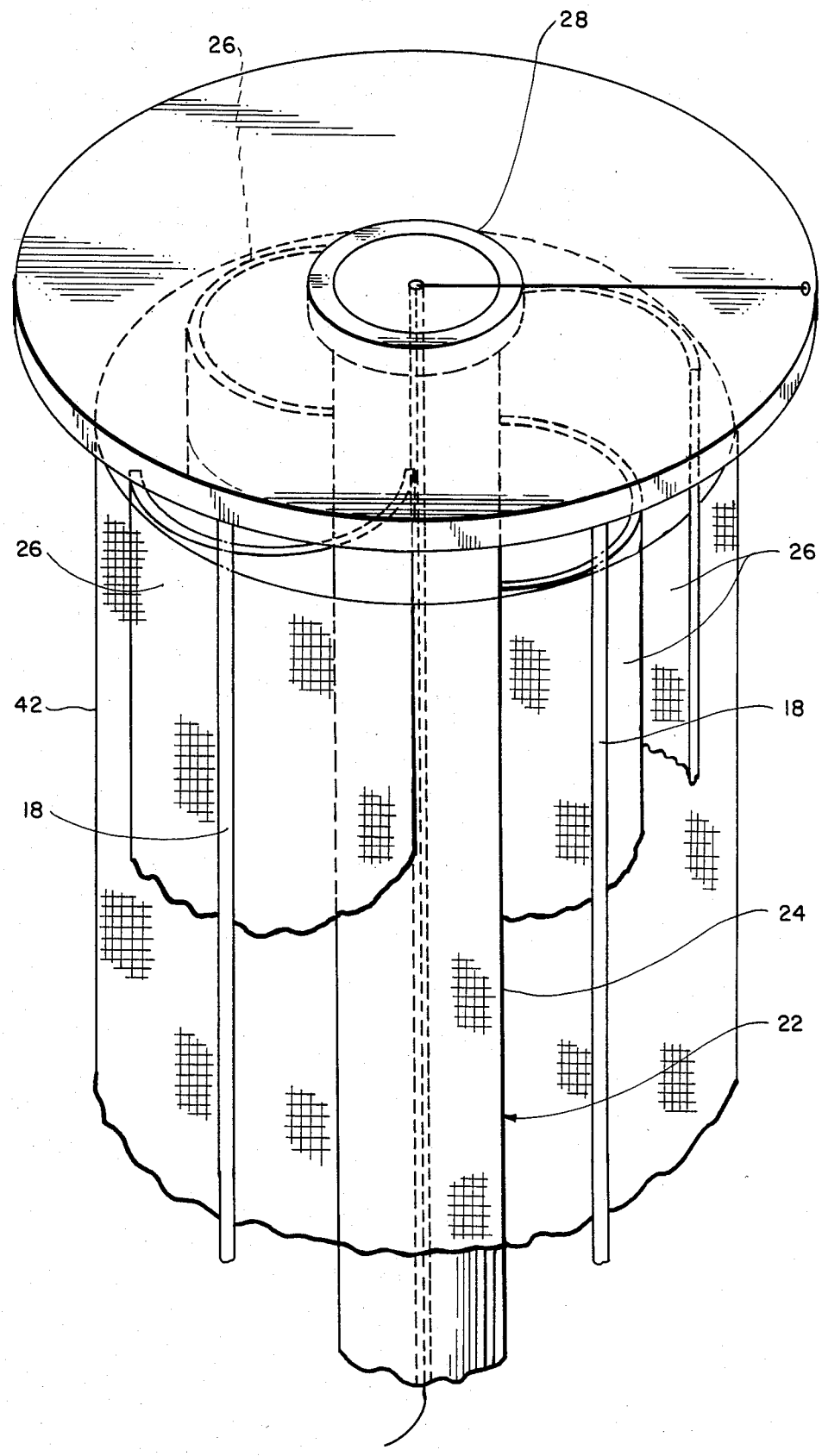
FIG. 3 is an enlarged isometric view of the top end portion of the rotor generator with the exterior wires omitted.

An elongated rotor, generally designated at 22, is longitudinally aligned within the framework 12, and is rotatably mounted therein. As seen in FIG. 2, and in more detail in FIG. 3, the rotor may include an elongated hub 24 on which there are mounted a plurality of curved blades 26. The hub 24 is preferably constructed from a conductive material such as iron. Each blade is preferably elongated and curved as seen in cross-section with their concave sides all facing in the same direction about a circle so that together they are capable of causing rotation of the rotor when there is fluid flow transverse to the framework 12. The rotor may be rotatably mounted within the framework 12 by a pair of bearings 28 (see FIG. 2), each bearing being centrally positioned within a respective plate 14 and 16. The bearings 28 are preferably constructed from a non-conductive material, such as Teflon. As shown in FIG. 1, the framework may have legs 32 extending therebelow for positioning the framework a predetermined distance above a supporting surface, such as the ocean bottom.

Figure 6:
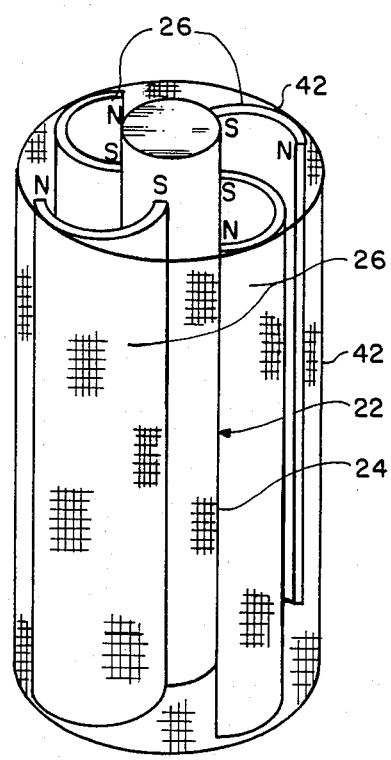
FIG. 6 is an isometric view of the rotor portion of the rotor generator.

FIG. 6 illustrates a preferred embodiment of the rotor 22 wherein both the hub 24 and the blades 26 are constructed of metal. In this embodiment each blade is a magnet with the outside edge being of one polarity, such as north, and the inside edge, which is attached to the hub, being of an opposite polarity, such as south. The polarities of the outer edges of each blade should be the same, as illustrated in FIG. 6. Another embodiment of the rotor could include magnets attached to the edge of the plastic or metal blades 26.

Figure 4:
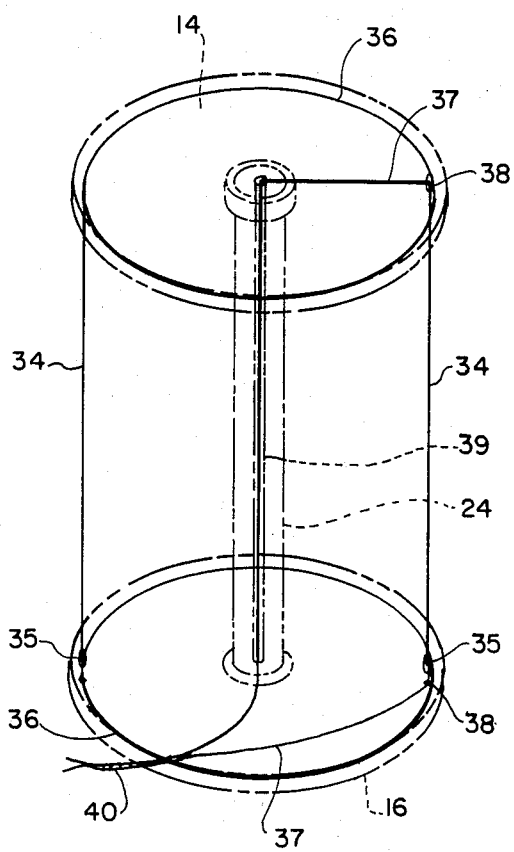
FIG. 4 is an isometric circuit diagram of a portion of the circuitry of the rotor generator with portions of the rotor generator shown in phantom.

As illustrated in FIG. 2, a plurality of conducting wires 34 are mounted on the framework about the rotor 22 in a spaced apart relationship so that when the rotor is rotated electrical current is induced in the wires. The conducting wires 34, which preferably have an insulation jacket, are connected between the plates 14 and 16 in a taut fashion, parallel to one another and parallel to the longitudinal axis of the rotor hub 24. FIG. 4 shows the plates 14 and 16 with only a pair of the wires 34 extending therebetween. The wires 34 extending into the plates through apertures 35 in the inwardly facing wall of each plate and are all connected in common to a generally circular wire 36 within each plate. The wires 34 may be held taut in their positions by epoxy at each aperture 35 of the plates. The open space between the wires 34 should be of a magnitude to ensure efficient rotation of the rotor 22 by water flow. The magnitude of the spacing is somewhat dependent upon the velocity of water flow, but should be in a range of 50%–90%.

A feeder wire 37 is connected within each plate to a respective common circular wire 36, each feeder wire exiting a respective plate through an aperture 38 in the outwardly facing wall of each plate. These apertures are left open so that the hollow plates 14 and 16 will pressure compensate. The top feeder wire 37 extends downwardly through a passageway 39 in the hub 24 and joins with the bottom feeder wire 37 to make up a cable 40.

Figure 5:
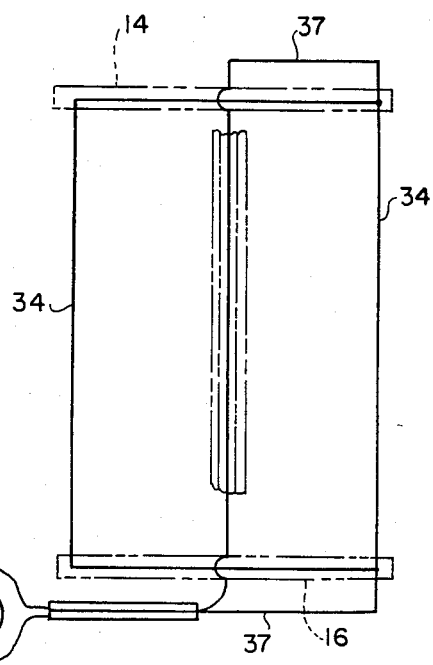
FIG. 5 is a circuit diagram of a portion of the circuitry of the rotor generator with portions of the rotor generator shown in phantom.

The circuit diagram for the rotor generator is illustrated in FIG. 5. All wires should be connected in a sealed fashion so that ocean water will not short out this circuit. Further, this circuit should not be electrically connected to any of the other metal elements of the rotor generator, such as the plates 14 and 16 or the metal hub 24. This is accomplished by making all the wires of the insulative jacket type. The plates 14 and 16 by being metal serve a very useful function, namely protecting the feeder wires 37 from induced current from the flux of the rotating blades 26. Also, the metal hub 24 serves the function of establishing a common electrical connection for the inside edges of the blades 26.

Still another important aspect of the invention is a large mesh screen 42 which encompasses the rotor blades 26 and may be attached along their outer edges by any suitable means such as welding. The size of the mesh should be at least one half inch so that water will freely flow therethrough to rotate the rotor 22. The purpose of this screen is to more uniformly distribute the flux in an annular fashion about the outside edges of the blades 26 and thereby provide a more uniform voltage output through the wires 34 as the rotor turns. It is to be understood that all metal elements of the rotor generator could be coated with an epoxy or made of stainless steel to prevent corrosion.

OPERATION OF THE INVENTION

In the preferred operation of the invention, the rotor generator 10 is placed on the ocean bottom, as illustrated in FIG. 1, with its output lead 40 connected to an energy storage apparatus, such as a battery 48. The battery 48 may be utilized for powering any submerged oceanographic instrumentation, generally designated at 50, such as temperature and/or salinity sensor/recorders. The oceans generally have prevailing currents along their bottoms which will cause rotation of the rotor 22 of the generator 10. Because of the spacing between the conducting wires 34 and the large mesh of the screen 42 there is minimal impediment to this current flow impinging on the rotor blades 26. As the rotor 22 rotates in response to this ocean current electrical current is induced into the conducting wires 34, which current is collected by the common wires 36 and thence fed to the lead via feeder wires 37. Stray flux is kept from the feeder wires 37 by the metal of the plates 14 and 16. By extending the top feeder wire 37 down through the hub 24 this feeder wire is protected from the flux about the rotor.

Obviously many modifications and variations of the present invention are possible in the light of the above teachings. It is therefore to be understood that within the scope of the appended claims the invention may be practiced otherwise than as specifically described.

What is claimed is:

1. A rotor generator which is adapted to be operated in a moving fluid environment comprising:
   a rotor which has a plurality of blades;
   each blade including magnetized means;
   a plurality of conducting wires;
   framework means arranging the conducting wires about the rotor, for location in the moving fluid environment with the wires extending substantially perpendicular to the prevailing direction of fluid flow;
   the framework means also arranging the wires with spaces therebetween so that moving fluid will impinge on the blades;
   means for rotatably mounting the rotor within the framework so that moving fluid will rotate the rotor and cause electrical current to be induced in the conducting wires; and
   means for collecting the induced electrical current so that the electrical current can be provided for power purposes.

2. A rotor generator as claimed in claim 1 wherein the collecting means includes:
   the framework including a hollow plate at opposite ends thereof;
   the conducting wires extending parallel to one another between the plates with their ends extending into the plates; and
   a common wire being located within each plate and connected to the respective ends of the conducting wires.

3. A rotor generator as claimed in claim 2 wherein the collecting means further includes:
   a feeder wire connected to each common wire; and
   each feeder wire exiting a respective plate, one of the feeder wires thence extending centrally through the rotor and through the opposite plate to form a two conductor cable with the other feeder wire.

4. A rotor generator as claimed in claim 3 including:
   each blade being made of metal; and
   the magnetized means being each blade being magnetized with the outer edge of the blade being of one polarity and the inner end thereof being of the opposite polarity.

5. A rotor generator as claimed in claim 4 including:
   the blades being connected to a metallic hub;
   each blade being elongated and having a curved shape as seen in cross-section so as to have a concave side for receiving fluid flow; and
   the concave sides of the blades all facing in the same direction about a circle.

6. A rotor generator as claimed in claim 5 including:
   a large mesh metallic screen connected about the blades.

7. A rotor generator as claimed in claim 6 including:
   the hollow plates being metallic.

8. A rotor generator which is adapted to be operated in a moving fluid environment comprising:
an elongated generally cylindrically shaped framework which is locatable in the fluid environment;
an elongated rotor longitudinally aligned within the framework for exposure to the fluid environment and rotatably mounted in the framework with its axis positionable substantially perpendicular to the prevailing direction of fluid flow;
the rotor having a hub and a plurality of curved blades, the blades being mounted on the hub and being capable of causing rotation of the rotor when fluid flow impinges on the blades;
the rotor including magnetized means;
a plurality of conducting spaced apart wires mounted on the framework about the rotor with the wires extendable substantially perpendicular to the prevailing direction of fluid flow so that when the rotor is rotated electrical current is induced in the wires; and
means for collecting the induced electrical current so that the electrical current can be provided for power purposes.

9. A rotor generator as claimed in claim 8 including:
each blade being elongated and having a curved shape as seen in cross-section so as to have a concave side for receiving fluid flow; and
the concave sides of the blades all facing in the same direction about a circle.

10. A rotor generator as claimed in claim 9 including:
the framework having a pair of hollow plates which are spaced apart by longitudinally extending bars; and
the conducting wires extending between and into the plates in a parallel relationship.

11. A rotor generator as claimed in claim 10 wherein the collecting means includes:
a common wire located within each plate and the ends of the conducting wires being respectively connected thereto; and
a feeder wire connected to each common wire within the plates and thence exiting each plate in a direction away from the rotor.

12. A rotor generator as claimed in claim 11 wherein the collecting means further includes:
the hub having a longitudinal passageway; and
one of the feeder wires extending through the hub passageway and through the opposite plate to form a two wire cable with the other feeder wire.

13. A rotor generator as claimed in claim 12 including:
each blade being made of metal; and
the magnetized means being each blade being magnetized with the outer edge of the blade being of one polarity and the inner end thereof being of the opposite polarity.

14. A rotor generator as claimed in claim 13 including:
a large mesh metallic screen connected about the blades; and
the rotor hub being metal.

15. A rotor generator as claimed in claim 14 wherein the framework includes:
legs extending therebelow for supporting the framework and the rotor above a supporting surface.

16. A rotor generator as claimed in claim 15 including:
the open space between the conducting wires being in the range of 50% to 90%.

* * * * *